United States Patent [19]
Brown et al.

[11] Patent Number: 5,701,142
[45] Date of Patent: *Dec. 23, 1997

[54] POINTING STICK WITH TRIPOD ACTUATOR FOR CURSOR CONTROL IN A COMPUTER KEYBOARD

[75] Inventors: Daniel R. Brown, Colfax, Wash.; Patrick J. Franz, Portland, Oreg.

[73] Assignee: In-Control Solutions, Inc., Lake Oswego, Oreg.

[*] Notice: The term of this patent shall not extend beyond the expiration date of Pat. No. 5,407,285.

[21] Appl. No.: 480,163

[22] Filed: Jun. 7, 1995

Related U.S. Application Data

[63] Continuation-in-part of Ser. No. 410,348, Mar. 24, 1995, Pat. No. 5,568,987, which is a continuation of Ser. No. 275,946, Jul. 14, 1994, Pat. No. 5,407,285, which is a continuation-in-part of Ser. No. 104,777, Aug. 9, 1993, Pat. No. 5,541,622, which is a continuation of Ser. No. 96,485, Jul. 22, 1993, abandoned, which is a division of Ser. No. 557,546, Jul. 24, 1990, Pat. No. 5,231,386.

[51] Int. Cl.⁶ .................................................. G09G 5/22
[52] U.S. Cl. ...................... 345/168; 345/161; 400/490
[58] Field of Search ..................... 400/490; 345/161, 345/168, 174

[56] References Cited

U.S. PATENT DOCUMENTS

| | | | |
|---|---|---|---|
| 4,029,915 | 6/1977 | Ojima | 200/5 A |
| 4,313,113 | 1/1982 | Thornburg | 340/709 |
| 4,394,548 | 7/1983 | Dola | 200/6 A |
| 4,680,577 | 7/1987 | Straayer et al. | 340/711 |
| 4,947,461 | 8/1990 | Yoshioka et al. | |
| 5,012,230 | 4/1991 | Yasuda | 345/184 |
| 5,231,386 | 7/1993 | Brandenburg et al. | 345/174 |
| 5,407,285 | 4/1995 | Franz | 400/490 |
| 5,541,622 | 7/1996 | Engle et al. | 345/161 |
| 5,568,987 | 10/1996 | Franz | 400/490 |

*Primary Examiner*—Richard Hjerpe
*Assistant Examiner*—Ricardo Osorio
*Attorney, Agent, or Firm*—Marger, Johnson, McCollom & Stolowitz

[57] ABSTRACT

Pointing stick assembly for use in a computer keyboard for cursor control is disclosed. The assembly includes a pointing button coupled through a plurality of rigid actuator legs to force sensors. For pointing operations, the pointing button is pressed in a desired direction by a user for moving a cursor in a corresponding direction on a display screen. Apertures are provided extending through one or more keycaps on the keyboard for mounting the pointing assembly. Each actuator leg is positioned in one of the apertures so that no additional keyboard space is required for the pointing device, thereby obviating a separate mouse, keyboard mounted trackball or the like.

12 Claims, 1 Drawing Sheet

POINTING STICK WITH TRIPOD ACTUATOR FOR CURSOR CONTROL IN A COMPUTER KEYBOARD

This application is a continuation-in-part of commonly-assigned, U.S. application Ser. No. 08/410,348, filed Mar. 24, 1995, now U.S. Pat. No. 5,568,987, which is a continuation of commonly-assigned U.S. application Ser. No. 08/275,946, filed Jul. 14, 1994, now U.S. Pat. No. 5,407,285; which is a continuation-in-part of commonly-assigned U.S. application Ser. No. 08/104,777, filed Aug. 9, 1993, now U.S. Pat. No. 5,541,622, which is a continuation of commonly-assigned, U.S. application Ser. No. 08/096,485, filed Jul. 22, 1993, now abandoned, which is a division of U.S. application Ser. No. 07/557,546, filed Jul. 24, 1990, U.S. Pat. No. 5,231,386 all incorporated herein by this reference.

BACKGROUND OF THE INVENTION

1. Field of the Invention

The present invention relates generally to apparatus for controlling cursor movement on a video display terminal (VDT) and more particularly to a pointing stick apparatus which is integrated together with neighboring keyswitches in a computer keyboard so as to minimize the size of the keyboard and maximize user convenience during pointing.

2. Description of the Related Art

Prior art keyboard pointing devices for controlling a cursor on a VDT are known. For example, U.S. Pat. No. 4,680,577 to Straayer, et al. (the '577 patent) discloses a multi-purpose key on a computer keyboard for controlling the cursor. Strain gauges are coupled to the multi-purpose key, which also serves as a regular typing key, for sensing lateral forces applied by the user's fingertip for cursor control. One of the problems with prior art devices, even those that are force-sensitive, is that a user gets no response to lateral displacement initially, until an electrode makes initial contact, for example, with an elastomeric resistive layer. The initial contact causes a step response, as resistance drops from infinity to a measurable value—a jump the user may not have anticipated or desired. Then, as force is increased, resistance falls rapidly, over some range, and finally falls more slowly with the application of additional force. All of this is disconcerting to a user for most applications. U.S. Pat. No. 5,231,386 (the '386 patent) discloses a keyswitch-integrated pointing device in which the force sensors are "preloaded" to an operating state such that there is no "jump" when a user starts to point to move the cursor. International patent application PCT/US90/06831 owned by Lexmark International also shows pointing apparatus for use in a keyboard for cursor control.

Most prior art "joysticks" are not sensitive to vertical or "Z-axis" force, because they have a rigid pivot or support underlying the joystick handle. As a result, vertical force cannot be measured or detected. The '386 patent shows how to produce a signal proportional to vertical force. Such a signal can be used, for example, to control line width while drawing as a function of z-axis force on the pointing device.

One problem with the prior apparatus is that the multi-purpose keyswitch or integrated keyswitch combines typing and cursor control into the same keycap. Some users, however, prefer to have a separate, different control or button for cursor control. A separate button is advantageous because the computer can detect actuation of the cursor control as distinguished from typing. The prior art '577 patent, for example, required a separate switch to enable the pointing sensors, since they were built into the typing key. A separate "pointing stick" has this advantage and does not require another switch; it can remain always "on". However, a separate pointing stick takes up precious keyboard space. For example, some portable or laptop computers have a trackball below the spacebar or off the side of the keyboard. These are not convenient. One solution is a keyboard-integrated "pointing stick" as described in commonly-owned U.S. Pat. No. 5,407,285. The present invention is directed to an alternative pointing stick for cursor control that effectively occupies no space on the keyboard, yet requires only minimal modification of one or more existing key caps.

SUMMARY OF THE INVENTION

One aspect of the present invention is a novel pointing stick assembly for cursor control in a computer keyboard. The new pointing stick is integrated into an otherwise standard keyboard among one or more neighboring keys. For example, the G-H-B keys define a preferred location since they are centrally located on the ubiquitous QWERTY keyboard. A pointing stick located at a location intermediate of these three keys can be conveniently operated by the index finger of either hand from the standard typing hand position.

Thus, in the preferred embodiment, three key caps are arranged adjacent each other in a generally triangular configuration and fit into the typing array of key caps in a computer keyboard. According to the invention, each of the first, second and third key caps has a respective aperture extending through it. Each aperture is substantially parallel to the usual up-down direction of travel of the key caps during typing. The pointing stick assembly further includes three rigid legs (a "tripod"), each sized and arranged so as to extend through a corresponding one of the key cap apertures and each having a respective top end and a respective bottom end. A pointing button is provided for actuation by a user, the pointing button rigidly coupled to the top ends of the said legs, such that the three legs depend below the pointing button and through the key cap apertures in substantially parallel proximity to each other. The pointing button is sized for actuation by a user's fingertip -approximately the diameter of a pencil.

All three of the key cap apertures are sized so as to allow slight lateral motion of the corresponding leg therein responsive to lateral components of a force applied to the pointing button by the user for cursor control. A force sensor, such as an array of force-sensitive resistors, is disposed below the key caps for transducing the applied force to form detectable electrical signals for cursor control. An actuator is rigidly coupled to the bottom ends of the legs and positioned for transmitting the applied forces from the legs to the force sensor. Preferably, the force sensor includes at least three separate force sensors spaced apart about a centerline of the pointing button so as to provide at least three distinct sensor electrical signals for resolving a lateral direction of the user-applied force. Four sensors are shown in the illustrated embodiment, as these conveniently provide differential, orthogonal direction signals. A minimum of two force sensors are adequate to resolve force direction. The foregoing and other objects, features and advantages of the invention will become more readily apparent from the following detailed description of a preferred embodiment which proceeds with reference to the drawings.

DETAILED DESCRIPTION OF THE PREFERRED EMBODIMENT

FIGS. 1 through 4 illustrate a preferred embodiment and application of the invention in a computer keyboard. In one aspect, the invention comprises a pointing stick assembly for cursor control. By a "pointing stick" we mean a button or stalk which is coupled to force sensors, as further described below, for sensing applied force for use such as cursor control. Preferably, the pointing stick extends slightly above the surrounding keycaps, so that it can be actuated and controlled by the user's fingertip independently of the surrounding keycaps which typically are used for alphanumeric typing.

Figure 1:
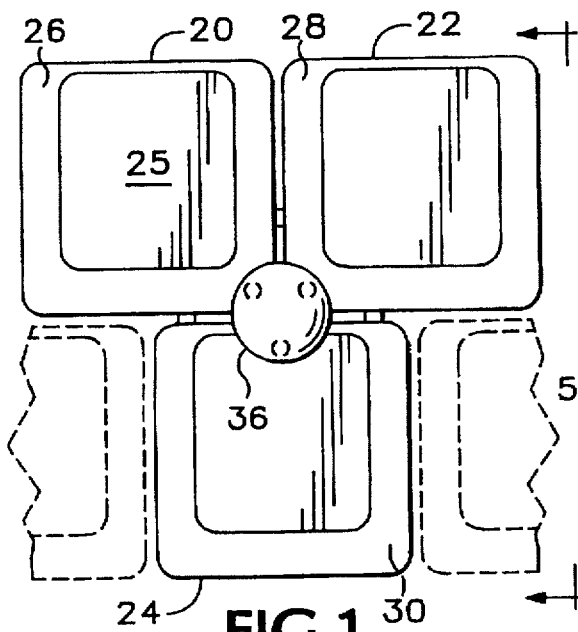
FIG. 1 is a top plan view of a selected portion of a computer keyboard that includes a pointing stick assembly for cursor control according to the present invention.

Referring now to FIG. 1, keycaps 20, 22, 24 typically have a generally flat or slightly concave top surface, such as top surface 25 of keycap 20, and beveled sidewalls 26, 28, 30, respectively. The beveled sidewalls are best illustrated in FIG. 1 taken together with the side view of FIG. 2.

The pointing stick assembly generally comprises a pointing button 36 which is coupled through three rigid legs 40, 42, 44 to an actuator assembly. The pointing button 36 is on the order of ¼" diameter, and the top portion preferably is formed of a pliable material for comfort and to minimize slipping when the user is applying force to the pointing button. The legs 40, 42, 44 should be formed of a stiff material, such as a metal or rigid polymeric material for efficiently transferring applied forces from the pointing button 36 to the actuator assembly below. Legs 40, 42, 44 are generally elongated and may have any convenient cross-sectional shape such as circular or square.

Figure 4:
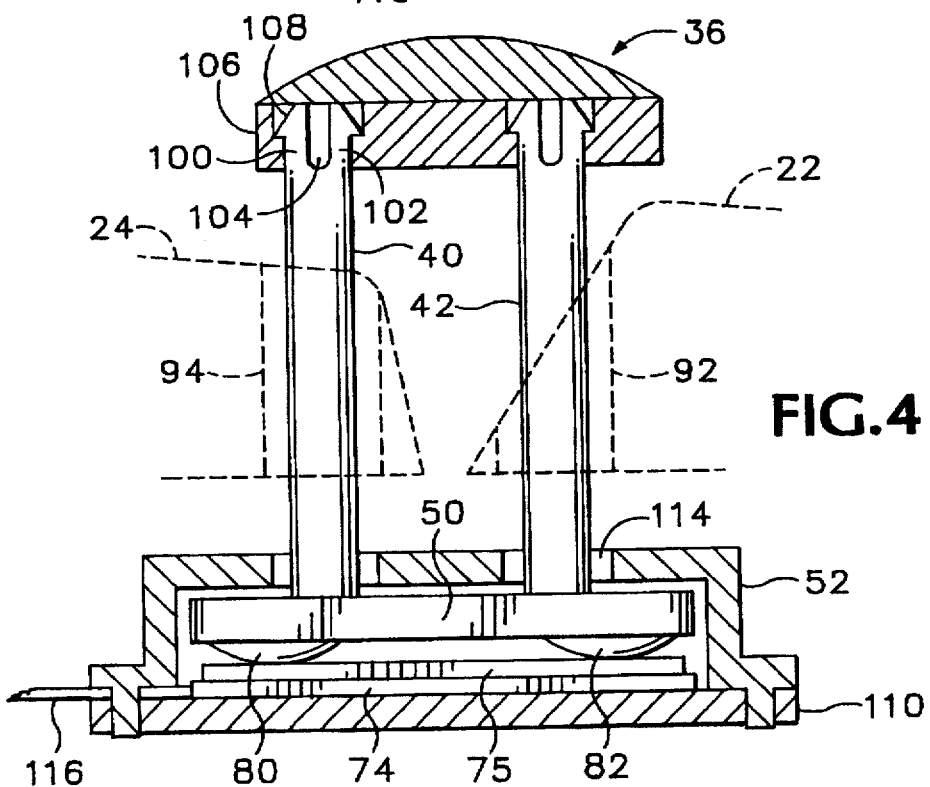
FIG. 4 is a further enlarged cross-sectional view of the pointing stick assembly portion of the apparatus of FIG. 1.

The top ends of the legs are fastened to the undersigned of pointing button 36 by any convenient means such as interlocking protrusions, interlocking threads, adhesive materials or the like. Preferably, a securing means is arranged for easy and permanent assembly during manufacture. For example, FIG. 4 illustrates in cross-section a fastening arrangement in which the leg, for example leg 40, includes a recess 104 extending longitudinally from the top end of the leg so as to form an opposed pair of clips 100, 102. A corresponding recess 108 is formed in the underside 106 of the pointing button for receiving the clips in interlocking engagement. For example, recess 108 includes a shoulder arranged for engaging a beveled tip portion of the clips 100, 102 when the top end of the leg (i.e. the clips) are fully inserted into the recess, thereby locking the legs and the pointing button together.

Figure 3:
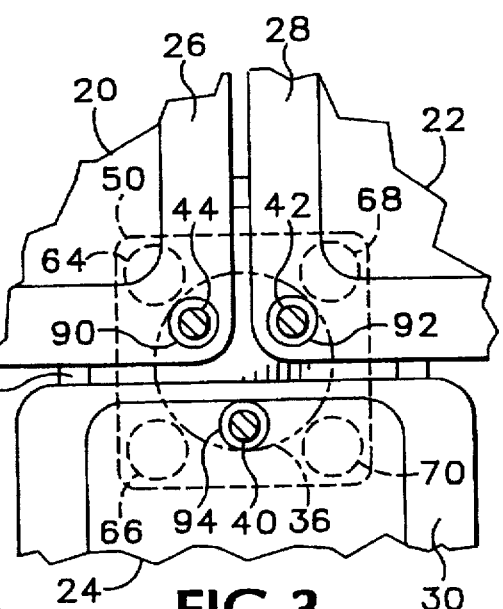
FIG. 3 is an enlarged top view of taken along line 3—3 of FIG. 2 showing detail of the apparatus of FIG. 1.
Figure 2:
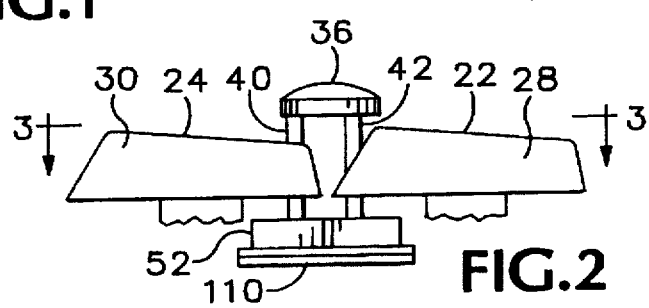
FIG. 2 is a side plan view of the apparatus of FIG. 1 taken along line 2—2 of FIG. 1.

FIG. 3 is an enlarged top plan view of the pointing assembly taken along line 3—3 of FIG. 2. Thus, FIG. 3 shows a top plan view of the pointing assembly essentially with the pointing button 36 removed. Each of the neighboring keycaps 20, 22, 24 includes an aperture 90, 92, 94, respectively, extending completely through the keycap generally parallel to the direction of keycap travel during normal typing operations. Each of the apertures 90, 92, 94 is sized and arranged to receive the legs 44, 42, 40, respectively, extending therethrough without contacting the aperture sidewall when the assembly is at rest. Further, each of the apertures provides clearance surrounding the respective leg to allow a slight lateral motion or rocking of the actuator assembly during pointing. Preferably, the three legs are arranged in generally a triangular configuration in top view, hence the term "tripod actuator". Other configurations using two, three or more legs for interconnecting the pointing button and the underlying actuator may be used. In general, they must be arranged to fit within the confines of an existing arrangement of keyswitches and keycaps on a keyboard. Recently, with the advent of laptop keyboards, size constraints are increasingly severe.

The pointing assembly, as noted, includes the pointing button 36, connecting legs and an actuator assembly. The actuator assembly comprises an actuator plate 50, shown in cross-section in FIG. 4 and in a phantom top view in FIG. 3. The actuator plate 50 may have a generally square configuration although its outline is not critical—provided it fits among the surrounding key switches without contact. The actuator assembly must be free to rock or tilt slightly in operation. The actuator plate 50 is sized to extend over a sensor assembly 74 (FIG. 4) which is disposed overlying the keyboard base plate 110 in generally parallel contact therewith, so that the base plate 110 provides a rigid foundation underlying the sensor assembly 74. Actuator surfaces or bumps 80,82 are provided on the underside of the actuator plate, each bump being aligned over a corresponding one of the force sensor elements described next.

Sensor assembly 74 includes a plurality of force sensing elements 64, 66, 68, 70 (FIG. 3) which may be formed, for example, of force sensitive resistive materials. Various other force or pressure sensing means such as strain gauges may be used is similar manner. A tail portion 116 of the assembly includes conductors for connecting the force sensing elements to electronic circuitry for measuring applied forces. Force sensors are further described in commonly-assigned application Ser. No. 07/948,143 incorporated herein by this reference. A rubber sheet or pad 75 is positioned in between the actuator bumps and the force sensing elements to improve distribution of user-applied forces over the force sensors.

An actuator housing 52 is coupled to the base plate 110 and secures the actuator assembly to the base plate. The housing 52 includes apertures, for example aperture 114, each sized to receive a corresponding leg (42) while allowing slight tilting movement of the leg and actuator plate without contacting the housing. Actuator bumps 80, 82 may be formed in the rubber sheet or directly protrude from the underside of the actuator plate toward the sensors, for transmitting forces from the pointing button 36 through the legs to the sensors. Thus, it may be seen that the pointing stick can be operated without contacting the surrounding keycaps. This is preferred to ensure that all forces applied to the pointing button 36 by a user's fingertip reach the sensors 64, 66, 68, 70. Any contact between the pointing assembly and a keycap would result erroneous sensor readings.

While the invention has been described in terms of a preferred embodiment having three legs interconnecting the pointing button and the actuator assembly, this number of legs is not critical. Two or more legs may be used. Apertures are formed in adjacent keycaps as necessary to accommodate the legs, preferably one aperture for each leg. However, an enlarged aperture may be formed in a selected keycap so as to accommodate two or more legs. Or, in a two-leg configuration, one aperture in each of an adjacent pair of keycaps would suffice. Any combination of multiple legs and one or more apertures through one or more keys is within the contemplation of the present inventors.

Noteworthy is the absence of any pivot type supporting means as in a conventional joystick. Rather, the pointing stick is supported solely by the actuator plate 246. Accordingly, downward or Z direction forces are coupled through the actuator surfaces to the force sensing areas 248. The present apparatus thereby measures the overall or net force applied by an operator. The net force can easily be computed by summing the forces on all the sensors. The net applied force information is useful in many applications, for example, to control cursor speed, or to provide Z axis control. Increasing the apparent cursor speed in response to a greater operator applied force provides a natural and ergonomically efficient response.

Having illustrated and described the principles of our invention in a preferred embodiment thereof, it should be readily apparent to those skilled in the art that the invention can be modified in arrangement and detail without departing from such principles. We claim all modifications coming within the spirit and scope of the principles. We claim all modifications coming within the spirit and scope of the accompanying claims.

We claim:

1. A pointing stick assembly for cursor control in a computer keyboard comprising:

at least a first keycap coupled to a first keyswitch for typing a first alphanumeric character into a computer;

at least one keycap aperture extending through the first keycap for receiving actuator legs;

a plurality of rigid actuator legs, sized and arranged so as to extend through said at least one key cap aperture and each actuator leg having a respective top end and a respective bottom end;

a pointing button for actuation by a user, the pointing button rigidly coupled to the top ends of said actuator legs such that the actuator legs depend below the pointing button in substantially parallel proximity to each other;

said at least one key cap aperture being sized so as to allow slight lateral motion of the actuator legs therein responsive to a force applied to the pointing button by a user for cursor control;

a force sensor for transducing the applied force to form a detectable electrical parameter; and;

an actuator rigidly coupled to the bottom ends of the legs and arranged for transmitting applied forces from the legs to the force sensor.

2. An apparatus according to claim 1 wherein:

said at least one keycap consists of two keycaps;

said at least one keycap aperture consists of two keycap apertures, each extending through a respective one of the two keycaps; and the plurality of rigid actuator legs consists of two actuator legs, each sized and arranged so as to extend through a respective one of the two keycap apertures.

3. An apparatus according to claim 1 wherein:

said at least one keycap aperture consists of two keycap apertures, both extending through a single one of said at least one keycap; and the plurality of rigid actuator legs consists of two actuator legs, each sized and arranged so as to extend through a respective one of the two keycap apertures.

4. An apparatus according to claim 1 wherein:

said at least one keycap consists of three keycaps;

said at least one keycap aperture consists of three keycap apertures, each extending through a respective one of the three keycaps; and the plurality of rigid actuator legs consists of three actuator legs, each sized and arranged so as to extend through a corresponding one of the three keycap apertures.

5. A pointing stick assembly with tripod actuator for cursor control in a computer keyboard comprising:

a first key cap coupled to a first keyswitch for typing a first alphanumeric character;

a second key cap coupled to a second keyswitch for typing a second alphanumeric character; and a third key cap coupled to a third keyswitch for typing a third alphanumeric character;

the first, second and third key caps being arranged adjacent each other in a generally triangular configuration for fitting into a typing array of key caps in a computer keyboard;

the first, second and third key caps each including a respective aperture extending therethrough for receiving a respective leg;

three rigid legs, each sized and arranged so as to extend through a corresponding one of the key cap apertures and each having a respective top end and a respective bottom end;

a pointing button for actuation by a user, the pointing button rigidly coupled to the top ends of the said legs, such that the three legs depend below the pointing button in substantially parallel proximity to each other;

all three of said key cap apertures being sized so as to allow slight lateral motion of the corresponding leg therein responsive to lateral components of a force applied to the pointing button by the user for cursor control;

a force sensor for transducing an applied force to form a detectable electrical parameter; and;

an actuator rigidly coupled to the bottom ends of the legs and arranged for transmitting applied forces from the legs to the force sensor.

6. An apparatus according to claim 5 wherein the force sensor comprises at least two separate force sensors so as to provide sensor electrical signals for resolving a direction of the user-applied force.

7. An apparatus according to claim 5 wherein the force sensor includes a force-sensitive resistor.

8. An apparatus according to claim 5 wherein the first, second and third legs are disposed substantially parallel to each other in a generally triangular configuration.

9. An apparatus according to claim 5 further comprising a rigid base plate underlying the force sensor so that said applied forces are efficiently transmitted to the force sensors.

10. An apparatus according to claim 5 further comprising a rubber sheet disposed intermediate the actuator and the force sensor for distributing applied forces over the force sensor.

11. An apparatus according to claim 5 wherein the pointing button is substantially round and has a predetermined top surface area less than a top surface area of any of the said key caps.

12. An apparatus according to claim 5 wherein the pointing button is located adjacent an intersection of the G-B-H keys of a keyboard.

* * * * *